(12) United States Patent
Otake (10) Patent No.: US 10,972,632 B2
(45) Date of Patent: Apr. 6, 2021

(54) INFORMATION PROCESSING APPARATUS WITH VOICE PRINT AUTHENTICATION AND PROGRAM

(71) Applicant: KONICA MINOLTA, INC., Tokyo (JP)

(72) Inventor: Toshihiko Otake, Ikeda (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/681,047

(22) Filed: Nov. 12, 2019

(65) Prior Publication Data

US 2020/0195811 A1   Jun. 18, 2020

(30) Foreign Application Priority Data

Dec. 17, 2018  (JP) .............................. JP2018-235302

(51) Int. Cl.
| | |
|---|---|
| *H04N 1/44* | (2006.01) |
| *H04N 1/00* | (2006.01) |
| *G10L 17/22* | (2013.01) |
| *G10L 17/00* | (2013.01) |

(52) U.S. Cl.
CPC ............. *H04N 1/442* (2013.01); *G10L 17/00* (2013.01); *G10L 17/22* (2013.01); *H04N 1/00403* (2013.01); *H04N 1/00408* (2013.01); *H04N 1/4433* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2011/0054908 | A1* | 3/2011 | Matsuda | ................. G10L 15/26 704/275 |
| 2019/0349488 | A1* | 11/2019 | Chitpasong | ........ H04N 1/00403 |
| 2020/0153984 | A1* | 5/2020 | Okumura | ........... H04N 1/00395 |

FOREIGN PATENT DOCUMENTS

| | | |
|---|---|---|
| JP | 2004109352 A | 4/2004 |
| JP | 2011049705 A | 3/2011 |

* cited by examiner

*Primary Examiner* — Andrew H Lam
(74) *Attorney, Agent, or Firm* — Buchanan Ingersoll & Rooney PC (57) ABSTRACT

There is provided an information processing apparatus in which voice operation is enabled, the information processing apparatus including: a voice input device that accepts voice input for voice operation; and a hardware processor that: sets an inputted condition as a job; identifies a content of voice operation based on a voice inputted to the voice input device, and reflects the content of the voice operation in setting of the job; returns the job set by the hardware processor to an initial setting condition; identifies a user by performing voice print authentication; and changes a time until a setting condition of the job is returned to the initial setting condition by the hardware processor, between a case where a user who has uttered the voice inputted to the voice input device is changed in the voice print authentication and a case where the user is not changed.

22 Claims, 7 Drawing Sheets

INFORMATION PROCESSING APPARATUS WITH VOICE PRINT AUTHENTICATION AND PROGRAM

The entire disclosure of Japanese patent Application No. 2018-235302, filed on Dec. 17, 2018, is incorporated herein by reference in its entirety.

BACKGROUND

Technological Field

The present invention relates to an information processing apparatus and a program, are particularly to a technique for automatically resetting a set value set by a user.

Description of the Related Art

An information processing apparatus such as multifunction peripherals (MFP) installed in an office is an apparatus shared by a plurality of users. The information processing apparatus has a plurality of functions such as a scan function, a print function, and a copy function, and executes a job corresponding to a function selected by the user. Such an information processing apparatus includes an operation panel for the user to perform various types of setting operation. The user can select one function from the plurality of functions or perform setting operation for the selected function, by performing operation on the operation panel.

A system has conventionally been known that enables the user to perform voice operation by uttering a voice on an operation screen displayed in the information processing apparatus (for example, JP 2011-49705 A). If such a system is used, the user can perform not only manual operation on the operation panel but also voice operation when using the information processing apparatus.

Further, in an information processing apparatus in which input operation using any one of a plurality of input devices is enabled, an information processing apparatus has been conventionally known having an auto-reset function that clears a set value set by the user so far and returns the apparatus to an initial state in a case where next input operation is not performed within a predetermined time after certain input operation is performed (for example, JP 2004-109352 A). Such an auto-reset function can automatically return a display screen to an initial screen after a predetermined time has elapsed in a case where the user has left the information processing apparatus without returning the display screen of the operation panel to the initial screen. For that reason, it is possible to prevent that a display state continues for a long time of high-security information such as image data being previewed or destination information, in the operation panel.

It is desired that the above-described auto-reset function is installed also in an information processing apparatus in which voice operation is enabled, from a viewpoint of security. In this case, for example, when the conventional technique disclosed in JP 2004-109352 A is applied, the auto-reset function clears the set value set by the user so far and returns the apparatus to the initial state in a case where a predetermined time elapses in a state in which manual operation is not performed on the operation panel and voice input is not detected.

However, since the information processing apparatus in which voice operation is enabled detects a voice uttered around the apparatus, the apparatus detects and inputs a voice even when a user different from a user performing voice operation utters the voice around the apparatus. In other words, the information processing apparatus inputs ambient noise as a voice. Thus, the information processing apparatus in which voice operation is enabled is affected by the ambient noise and the like, so that there is a problem that the auto-reset function does not work effectively.

SUMMARY

The present invention has been made to solve the above-described problem, and it is an object to provide an information processing apparatus and program capable of causing the auto-reset function to work effectively even in a configuration in which voice operation is enabled.

To achieve the above mentioned object, according to an aspect of the present invention, there is provided an information processing apparatus in which voice operation is enabled, and the information processing apparatus reflecting one aspect of the present invention comprises: a voice input device that accepts voice input for voice operation; and a hardware processor that: sets an inputted condition as a job; identifies a content of voice operation on the basis of a voice inputted to the voice input device, and reflects the content of the voice operation in setting of the job; returns the job set by the hardware processor to an initial setting condition in a case where a predetermined time has elapsed; identifies a user by performing voice print authentication each time a voice is inputted to the voice input device; and changes a time until a setting condition of the job is returned to the initial setting condition by the hardware processor, between a case where a user who has uttered the voice inputted to the voice input device is changed in the voice print authentication and a case where the user is not changed.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments. Note that, in the embodiment described below, the same reference numerals are given to elements that are common to each other, and duplicate descriptions thereof will be omitted.

Figure 1:
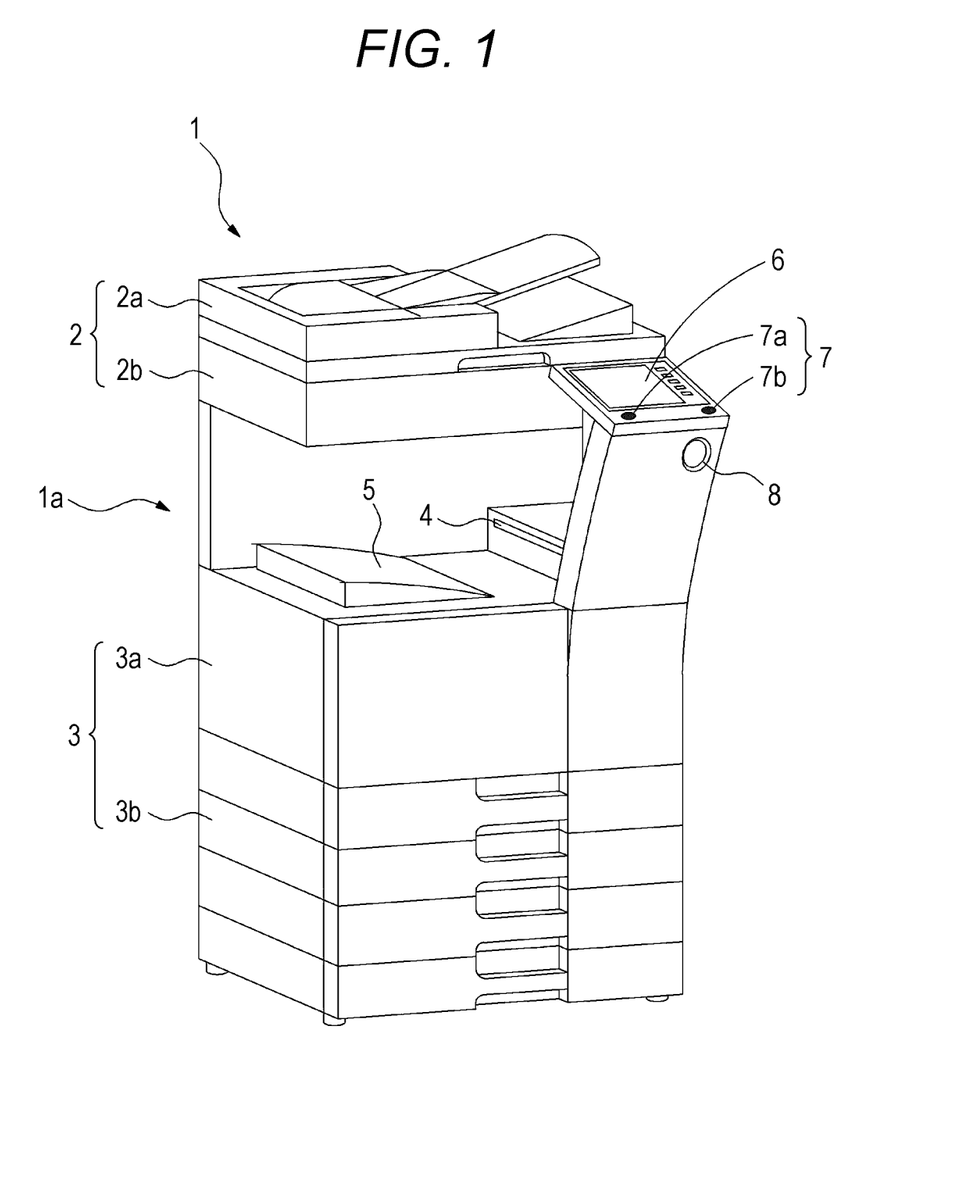
FIG. 1 is a diagram illustrating an example of an appearance configuration of an information processing apparatus.

FIG. 1 is a diagram illustrating an example of an appearance configuration of an information processing apparatus 1 that is an embodiment of the present invention. The information processing apparatus 1 illustrated in FIG. 1 is an image processing apparatus configured as an MFP, and has a plurality of functions such as a scan function, a print function, and a copy function, and executes a job corresponding to a function selected by a user.

The information processing apparatus 1 includes a scanner unit 2 on the upper part of an apparatus main body 1a. The scanner unit 2 includes an automatic document feeder (ADF) 2a and an image reading unit 2b. The automatic document feeder 2a picks up documents set by the user one by one and automatically conveys them to an image reading position for the image reading unit 2b. The image reading unit 2b optically reads an image of a document when the document conveyed by the automatic document feeder 2a passes through the image reading position, and generates image data corresponding to the image.

The information processing apparatus 1 also includes a printer unit 3 on the lower part of the apparatus main body 1a. The printer unit 3 includes an image forming unit 3a and a sheet feeding unit 3b, The sheet feeding unit 3b includes, for example, a plurality of sheet feeding cassettes, and each sheet feeding cassette can be stocked with sheet materials such as printing sheets. The sheet feeding unit 3b picks up sheet materials from one sheet feeding cassette one by one and automatically conveys each sheet material to an image transfer position for the is image forming unit 3a. The image forming unit 3a transfers a toner image to a sheet material when the sheet material conveyed by the sheet feeding unit 3b passes through the image transfer position, and then performs toner fixing processing on the sheet material. The image forming unit 3a ejects the sheet material on which the toner is fixed onto a sheet ejection tray 5 from an ejection port 4 formed at the center of the apparatus main body 1a.

The information processing apparatus 1 also includes an operation panel 6 on the front side of the apparatus main body 1a. The operation panel 6 is a user interface when the user performs operation on the information processing apparatus 1, and displays various operation screens that can be operated by the user and accepts operation by the user on the various operation screens. For example, the operation panel 6 accepts function selection operation by the user and further accepts detailed job setting operation for a function selected by the user. The screen displayed on the operation panel 6 is successively updated on the basis of the operation by the user. The operation panel 6 can accept manual operation by the user and can also accept voice operation by the user.

The operation panel 6 is provided with a plurality of microphones 7a and 7b having a sound collecting function. The microphones 7a and 7b constitute a voice input unit 7 for performing voice operation on the information processing apparatus 1. The plurality of microphones 7a and 7b are preferably provided, at positions separated by a predetermined, interval to be enabled to detect the directivity of voice. Note that, when there is no need to detect the directivity of voice, the voice input unit 7 may be constituted by a single microphone.

The information processing apparatus 1 also includes a voice output unit 8 including a speaker and the like on the front side of the apparatus main body 1a. The voice output unit 8 is for outputting various warning sounds to the user.

Figure 2:
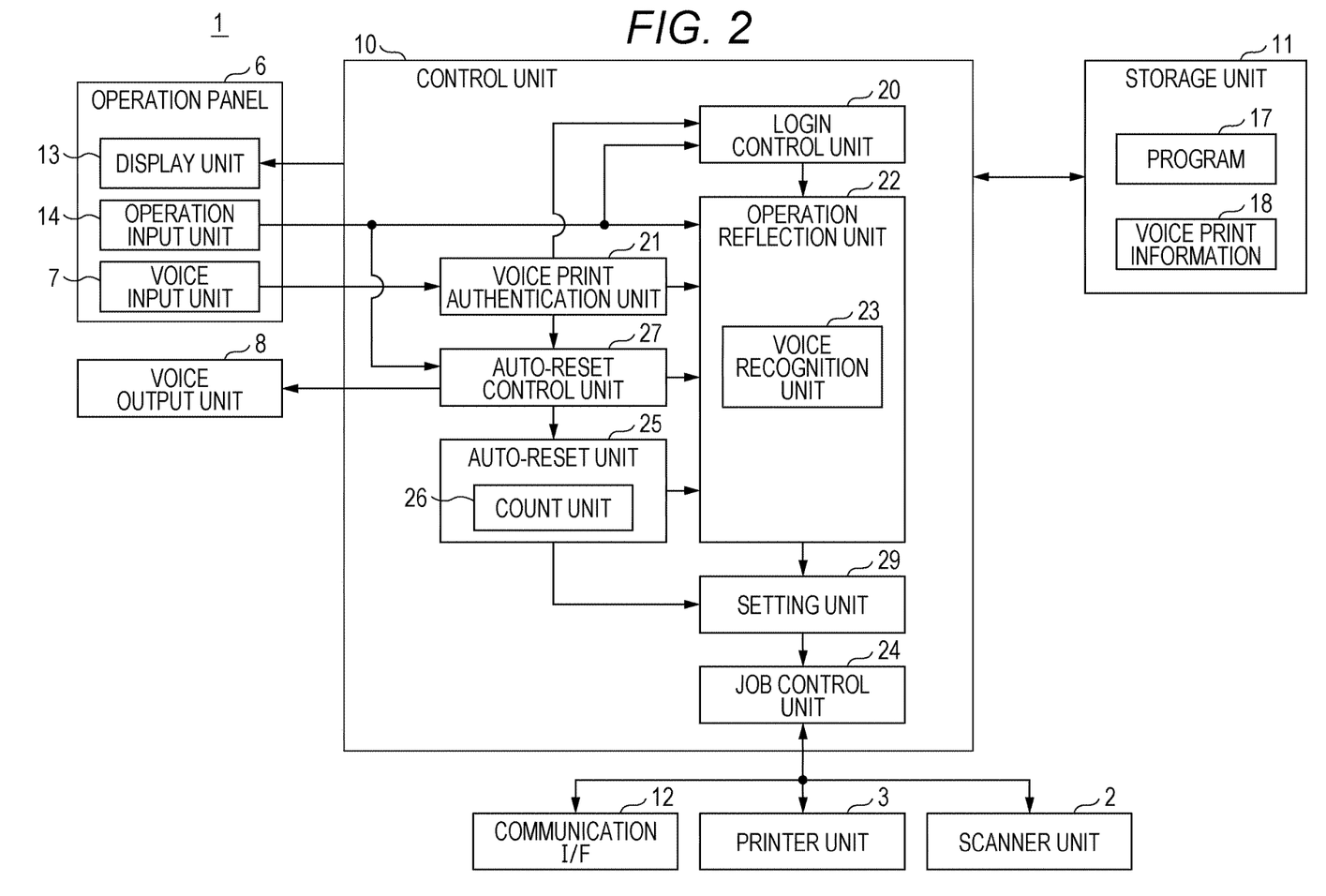
FIG. 2 is a block diagram illustrating an example of a hardware configuration and a functional configuration of the information processing apparatus.

FIG. 2 is a block diagram illustrating an example of a hardware configuration and a functional configuration of the information processing apparatus 1. The information processing apparatus 1 includes a control unit 10, a storage unit 11, and a communication interface 12, in addition to the scanner unit 2, the printer unit 3, the operation panel 6, and the voice output unit 8 described above.

The operation panel 6 is provided with a display unit 13 and an operation input unit 14 in addition to the voice input unit 7 described above. The display unit 13 includes, for example, a color liquid crystal display, and displays various operation screens that can be operated by the user. The operation input unit 14 includes, for example, a touch panel key arranged on a display screen of the display unit 13 and accepts manual operation by the user.

The storage unit 11 is a nonvolatile storage device including a hard disk drive (HDD), a solid state drive (SSD), or the like. The storage unit 11 stores a program 17 and voice print information 18 in advance. The program 17 is a computer readable program. The voice print information 18 is information in which a feature is pre-registered of a voice print for each user permitted to perform voice operation on the information processing apparatus 1.

The communication interface 12 is an interface for connecting the information processing apparatus 1 to a network such as a local area network (LAN) and communicating with an external apparatus via the network. The form in which the communication interface 12 communicates with the external apparatus may be wired communication or wireless communication. The external apparatus may be a personal computer (PC) or server provided in a local network, or may be a server provided on a cloud such as the Internet.

The control unit 10 includes, for example, a CPU and a memory (not illustrated). Then, the CPU reads and executes the program 17 stored in the storage unit 11, whereby the control unit 10 functions as a login control unit 20, a voice print authentication unit 21, an operation reflection unit 22, a job control unit 24, an auto-reset unit 25, an auto-reset control unit 27, and a setting unit 29.

The login control unit 20 performs control to shift an operation state of the information processing apparatus 1 between a login state and a logout state. The logout state is a state in which the user cannot use each function of the information processing apparatus 1. In the logout state, the login control unit 20 accepts login operation by the user. That is, when manual operation or voice operation is performed on the operation panel 6 in the logout state, the login control unit 20 performs user authentication for identifying the user. When the user who has performed manual operation or voice operation can be identified in the user authentication, the login control unit 20 sets the identified user as a login user, and shifts the operation state from the logout state to the login state.

For example, when the user performs manual operation on the operation panel 6 in the logout state, the operation input unit 14 of the operation panel 6 detects the manual operation by the user. The login control unit 20 acquires operation information indicating a content of the manual operation performed by the user via the operation input unit 14, and performs user authentication on the basis of the operation information. At this time, the login control unit 20 determines whether or not identification information such as a user ID and a password included in the operation information matches user information (not illustrated) pre-registered in the information processing apparatus 1. When the identification information input by manual operation by the user matches the user information, the login control unit 20 can identify the user who is operating the operation panel 6 on the basis of the user information. Then, the login control unit 20 authenticates the identified user as the login user, and shifts the operation state of the information processing apparatus 1 from the logout state to the login state.

In addition, for example, when the user utters a predetermined login keyword near the information processing apparatus 1 in the logout state, the voice input unit 7 detects the voice and outputs voice information corresponding to the detected voice. The voice information is output to the voice print authentication unit 21. The voice print authentication unit 21 is a processing unit that performs voice print authentication on the basis of the voice information output from the voice input unit 7 and identifies the user who has uttered the voice. The voice print authentication unit 21 analyzes a voice print of an input voice on the basis of the voice information and determines whether or not the voice print matches a voice print registered in the voice print information 18 of the storage unit 11. As a result, in a case where the voice print of the user who has performed voice input matches the feature of the voice print registered in the voice print information 18, the voice print authentication unit 21 identifies the user who has performed the voice input on the basis of the voice print information 18. Then, the voice print authentication unit 21 notifies the login control unit 20 of information regarding the identified user. Thus, in a case where voice input is performed by the user, the login control unit 20 can identify the user who has performed the voice input via the voice print authentication unit 21. Then, the login control unit 20 authenticates the user identified by the voice print authentication unit 21 as the login user, and shifts the operation state of the information processing apparatus 1 from the logout state to the login state.

In a case where the user who has performed manual operation or voice operation cannot be identified even though the manual operation or the voice operation by the user is detected in the logout state, the login control unit 20 causes the logout state to continue without shifting the operation state to the login state.

Note that, even in a case where the voice operation by the user is detected in the logout state and the user who has performed the voice operation can be identified, in a case where the voice uttered by the user does not match the predetermined login keyword, the login control unit 20 may cause the logout state to continue without shifting the operation state to the login state. That is, when shifting the operation state from the logout state to the login state on the basis of the voice operation, the login control unit 20 determines with the login keyword whether or not the user who has uttered the voice intends to use the information processing apparatus 1. As a result, in a case where a user who does not intend to use the information processing apparatus 1 utters a voice near the information processing apparatus 1, the logout state can be maintained without shifting the information processing apparatus 1 to the login state.

When shifting the operation state to the login state, and then detecting logout operation by the login user, the login control unit 20 shifts the operation state from the login state to the logout state. The logout operation in this case may be any of manual operation and voice operation by the login user.

When the information processing apparatus 1 shifts to the login state, the login user is able to select a function to be used from among the plurality of functions of the information processing apparatus 1, and perform detailed setting operation for the selected function, and then give an instruction to execute the job. In the login state, in the control unit 10, the operation reflection unit 22, the job control unit 24, the auto-reset unit 25, the auto-reset control unit 27, and the setting unit 29 mainly function. The voice print authentication unit 21 functions in both the logout state and the login state, and performs the voice print authentication based on a voice each time the voice is inputted to the voice input unit 7.

The voice print authentication unit 21 performs the voice print authentication each time a voice is inputted to the voice input unit 7 in the login state, and identifies the user who performed the voice operation. In the voice print authentication in the login state, there are a case where the same user as the login user is identified and a case where a user different from the login user is identified. Further, in the voice print authentication in the login state, there is also a case where the user registered in the voice print information 18 cannot be identified. In the voice print authentication in the login state, one of the above three cases is determined. The voice print authentication unit 21 outputs a result of the voice print authentication in the login state to each of the operation reflection unit 22 and the auto-reset control unit 27.

The operation reflection unit 22 is a processing unit that reflects, in each unit, manual operation or voice operation by the user, in the login state. The operation reflection unit 22 reflects in the setting unit 29 the manual operation or voice operation by the user, in the login state.

The setting unit 29 is a processing unit that sets detailed conditions when the job is executed, on the basis of setting operation by the user. The job conditions include, for example, specification of the sheet material, specification of resolution, specification of color/monochrome, specification of an output mode such as a layout and the number of copies, and the like. In other words, in a case where the manual operation or voice operation by the user is detected in the login state, the setting unit 29 sets conditions specified by the user for the job on the basis of an instruction from the operation reflection unit 22. The job conditions set by the setting unit 29 in this way may be referred to as setting conditions. As the job selling conditions, initial setting conditions are set in advance as defaults. Then, the setting unit 29 generates job setting conditions based on an instruction from the user by changing the initial setting conditions on the basis of the conditions specified by the user, and holds the job setting conditions.

The operation reflection unit 22 can also update the display screen of the display unit 13 on the basis of the manual operation or voice operation by the user. For example, when the information processing apparatus 1 shifts to the login state, the display unit 13 displays a screen that displays the job setting conditions set in the setting unit 29. The operation reflection unit 22 controls such a display screen.

Figure 3:
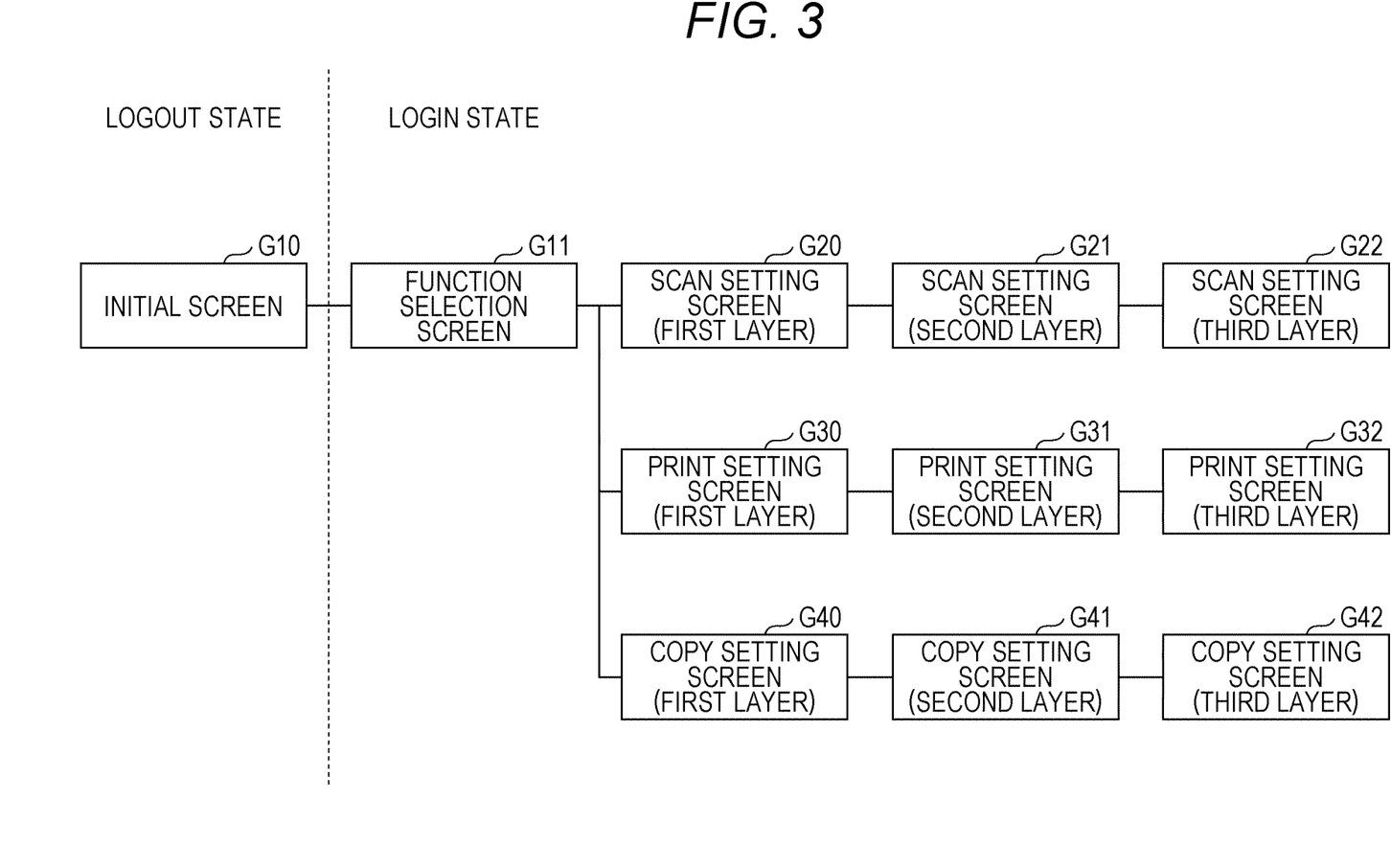
FIG. 3 is a diagram illustrating an example of a hierarchical structure of a display screen displayed on a display unit.

FIG. 3 is a diagram illustrating an example of a hierarchical structure of the display screen displayed on the display unit 13. When the information processing apparatus 1 is in the logout state, the operation reflection unit 22 is in a state in which an initial screen G10 is displayed on the display unit 13. The initial screen G10 is a screen that prompts the user to perform operation for login, and is a screen that guides the user to input information for login by manual operation or voice operation.

When the information processing apparatus 1 shifts to the login state, the operation reflection unit 22 first displays a function selection screen G11 on the display unit 13. The function selection screen G11 is a top screen in the login state, and is a screen for the user to select a desired function from the plurality of functions such as the scan function, the print function, and the copy function.

When the user selects the scan function while the function selection screen G11 is displayed on the display unit 13, the operation reflection unit 22 causes the display screen of the display unit 13 to transition to scan setting screens G20, G21, and G22 for performing setting operation regarding the scan function. The scan setting screens G20, G21, and G22 have a hierarchical structure. For that reason, the operation reflection unit 22 first causes the display unit 13 to display the scan setting screen G20 of the first layer when causing transition from the function selection screen G11. Thereafter, when predetermined operation is performed while the scan setting screen G20 of the first layer is displayed, the operation reflection unit 22 causes the display unit 13 to display the scan setting screen G21 of the second layer. Further, when predetermined operation is performed while the scan setting screen G21 of the second layer is displayed, the operation reflection unit 22 causes the display unit 13 to display the scan setting screen G22 of the third layer. While performing such screen transition, the operation reflection unit 22 reflects in the display screen the setting operation regarding the scan function performed by the user. The screen regarding the scan function displayed on the display unit 13 in this way is a screen reflecting scan job setting conditions (detailed settings) set in the setting unit 29.

In addition, when the user selects the print function while the function selection screen G11 is displayed on the display unit 13, the operation reflection unit 22 causes the display screen of the display unit 13 to transition to print setting screens G30, G31, and G32 for performing setting operation regarding the print function. The print selling screens G30, G31, and G32 also have a hierarchical structure. For that reason, the operation reflection unit 22 first causes the display unit 13 to display the print setting screen G30 of the first layer when. causing transition from the function. selection screen G11. Thereafter, when predetermined operation is performed while the print setting screen G30 of the first layer is displayed, the operation reflection unit 22 causes the display unit 13 to display the print setting screen G31 of the second layer. Further, when predetermined operation is performed while the print setting screen G21 of the second layer is displayed, the operation reflection unit 22 causes the display unit 13 to display the print setting screen G32 of the third layer. While performing such screen transition, the operation reflection unit 22 reflects in the display screen the setting operation regarding the print function performed by the user. The screen regarding the print function displayed on the display unit 13 in this way is a screen reflecting print job setting conditions (detailed settings) set in the setting unit 29.

Further, When the user selects the copy function while the function selection screen G11 is displayed on the display unit 13, the operation reflection unit 22 causes the display screen of the display unit 13 to transition to copy setting screens G40, G41, and G42 for performing setting operation regarding the copy function. The copy setting screens G40, G41, and G42 also have a hierarchical structure. For that reason, the operation reflection unit 22 first causes the display unit 13 to display the copy setting screen G40 of the first layer when causing transition from the function selection screen G11. Thereafter, when predetermined operation is performed while the copy setting screen G40 of the first layer is displayed, the operation reflection unit 22 causes the display unit 13 to display the copy setting screen G41 of the second layer. Further, when predetermined operation is performed while the copy setting screen G41 of the second layer is displayed, the operation reflection unit 22 causes the display unit 13 to display the copy setting screen G42 of the third layer. While performing such screen transition, the operation reflection unit 22 reflects in the display screen the setting operation regarding the copy function performed by the user. The screen regarding the copy function displayed on the display unit 13 in this way is a screen reflecting copy job setting conditions (detailed settings) set in the setting unit 29.

In a case where manual operation is performed by the login user, the operation reflection unit 22 reflects the content of the manual operation in the display screen by performing the screen transition as described above on the basis of the content of the manual operation. In a case where voice operation is performed by the login user, the operation reflection unit 22 first performs processing for identifying a content of the voice operation. To identify the content of the voice operation, the operation reflection unit 22 includes a voice recognition unit 23.

The voice recognition unit 23 is a processing unit that analyzes voice information corresponding to a voice inputted by the login user and identifies the content of the voice operation. That is, the voice recognition unit 23 performs processing for identifying a word uttered by the login user by analyzing the voice information. The content of the voice operation is identified by the word identified at this time. In other words, when the word uttered by the login user cannot be identified, the content of the voice operation cannot be identified.

When the content of the voice operation uttered by the login user is identified by the voice recognition unit 23, the operation reflection unit 22 determines a screen to be displayed on the display unit 13 on the basis of the identified content. Then, the operation reflection unit 22 causes the display unit 13 to display the determined screen with the content of the voice operation reflected. In this way, a display screen based on the voice operation of the login user is displayed on the display unit 13.

The operation reflection unit 22 causes the job control unit 24 to operate when an instruction to execute a job is given by the user.

The job control unit 24 controls the execution of the job designated by the user by causing the scanner unit 2, the printer unit 3, and the communication interface 12 to operate. When starting the execution of the job, the job control unit 24 acquires the job setting conditions set by the setting unit 29, and executes the job with the setting conditions reflected.

For example, in the case of a copy job, the job control unit 24 drives the scanner unit 2 and the printer unit 3 to control reading operation of a document set by the user, and further controls image forming operation based on image data generated by reading the document. In addition, in the case of a scan job, the job control unit 24 can store the image data generated by reading the document in the storage unit 11 or transmit the image data to an external apparatus via the communication interface 12. Further, in the case of a print job, the job control unit 24 can acquire data to be primed from the storage unit 11 or can acquire the data from an external apparatus via the communication interface 12. Then, the job control unit 24 drives the printer unit 3 to control image forming operation based on the data to be printed.

The auto-reset unit 25 is a processing unit that performs auto-reset to automatically reset the setting conditions set by the user so far in a case where a predetermined time has elapsed in the login state. That is, when the predetermined time has elapsed in the login state, the auto-reset unit 25 performs processing to return the job setting conditions set in the setting unit 29 to the initial setting conditions. As a result, the job setting conditions managed by the setting unit 29 return to the initial state. The auto-reset unit 25 also performs processing for returning the display screen of the display unit 13 to the initial screen G10 along with returning the job setting conditions to the initial setting conditions.

The auto-reset unit 25 performs auto-reset in a case where the elapsed time since the previous operation performed by the login user has reached the predetermined time. For that reason the auto-reset unit 25 includes a count unit 26. The count unit 26 is a processing unit that counts the elapsed time since the previous operation performed by the login user. A time for counting until the auto-reset is caused to work, is set in advance in the count unit 26. However, the predetermined time can be changed. The count unit 26 starts count operation along with shifting to the login state, and continues the count operation at all times during a period of the login state. When a count value (measurement time) by the count unit 26 reaches the predetermined time, the auto-reset unit 25 determines that it is a timing to cause the auto-reset to work.

When performing auto-reset, the auto-reset unit 25 instructs the setting unit 29 to return the job setting conditions to the initial setting conditions. As a result, the setting unit 29 clears the job setting conditions specified by the login user, and returns the job setting conditions to the initial setting conditions. In addition, when performing the auto-reset, the auto-reset unit 25 clears all set values set by the login user so far on each setting screen described above and returns the set values to the default values. Further, the auto-reset unit 25 automatically shifts the operation state from the login state to the logout state. Thus, when the auto-reset by the auto-reset unit 25 works, the information processing apparatus 1 automatically returns to the logout state and the display screen of the display unit 13 returns to the initial screen G10, even if there is no logout operation by the login user.

The auto-reset control unit 27 is a processing unit that controls the auto-reset unit 25 in the login state. In particular, the auto-reset control unit 27 performs control for causing an auto-reset function by the auto-reset unit 25 to work effectively in the login state in which the login user can perform voice operation. That is, when a voice is inputted to the voice input unit 7 in the login state, the auto-reset control unit 27 causes the auto-reset function to work effectively by changing the time until the auto-reset works on the basis of the result of the voice print authentication in the voice print authentication unit 21.

The auto-reset control unit 27 performs the change so that conditions under which the auto-reset is performed are different from each other between: a case where the voice is inputted to the voice input unit 7, and the user who has uttered the voice is identified as the login user currently performing voice operation by the voice print authentication unit 21; and a case where the user is not identified as the login user. For example, in a case where the user who has uttered the voice is identified as the login user by the voice print authentication unit 21, the auto-reset control unit 27 changes the conditions so that the auto-reset is difficult to work. On the other hand, in a case where the user who has uttered the voice is not identified as the login user by the voice print authentication unit 21, the auto-reset control unit 27 changes the conditions so that the auto-reset is easy to work. However, in the case where the user who has uttered the voice is not identified as the login user by the voice print authentication unit 21, the auto-reset control unit 27 does not have to change the conditions for the auto-reset to work.

Specifically, for example, in a case where a voice is inputted to the voice input unit 7 while the count unit 26 of the auto-reset unit 25 is counting the predetermined time, and, the voice print authentication unit 21 identifies that the voice is uttered by the login user, the auto-reset control unit 27 resets the count by the count unit 26. In other words, the count value counted by the count unit 26 so far is initialized to 0. As a result, since the time until the auto-reset works is extended, the conditions are changed so that the auto-reset is difficult to work.

In a case where the user who has uttered the voice is identified as the login user, the auto-reset control unit 27 may extend and set the predetermined time counted by the count unit 26. Also in this case, since the time until the auto-reset works is extended, the conditions can be changed so that auto-reset is difficult to work.

On the other hand, in a case where a voice is inputted to the voice input unit 7 while the count unit 26 of the auto-reset unit 25 is counting the predetermined time, and the voice print authentication unit 21 does not identify that the voice is uttered by the login user, the auto-reset control unit 27 continues counting by the count unit 26 without resetting the count. As a result, in the case where the user is not identified as the login user, the auto-reset works at an earlier timing than in the case where the user is identified as the login user.

In addition, in the case where the user who has uttered the voice is not identified as the login user, the auto-reset control unit 27 may shorten and set the predetermined time counted by the count unit 26. In this case, since the time until the auto-reset works is shortened, the auto-reset works at an earlier timing.

In a state in which a screen reflecting a content of voice operation or manual operation by the login user is displayed on the display unit 13, when input by manual operation is not performed on the operation input unit 14, and a voice is not input to the voice input unit 7, the auto-reset control unit 27 continues counting by the count unit 26. In other words, when a no-input state continues of the manual operation and voice operation, the auto-reset control unit 27 continues counting by the count unit 26. Thus, in a case where the next manual operation or voice operation is not performed until the predetermined time has elapsed after the previous manual operation or voice operation by the login user is performed in the login state, the auto-reset is performed by the auto-reset unit 25, the job setting conditions return to the initial setting conditions, and the display screen of the display unit 13 returns to the initial screen G10.

In a case where the voice print authentication unit 21 does not identify that the voice is uttered by the login user in the login state, there is a possibility that a user other than the login user exists near the information processing apparatus 1. When the user other than the login user exists near the information processing apparatus 1, it is necessary to inhibit unauthorized use of the information processing apparatus 1 by such a user. For that reason, in the case where the voice print authentication unit 21 does not identify that the voice is uttered by the login user, the auto-reset control unit 27 may restrict a function available to the login user thereafter. That is, the auto-reset control unit 27 causes the operation reflection unit 22 to restrict the function available to the login user by giving a function restriction instruction to the operation reflection unit 22. Hereinafter, some examples will be described in which the auto-reset control unit 27 performs function restrictions.

For example, the auto-reset control unit 27 restricts switching to a function different from a function for which the login user is currently performing operation. For example, when the login user selects the scan function and is performing the setting operation, in a case where a voice of a user different from the login user is inputted, the auto-reset control unit 27 restricts switching to the copy function or the print function. As a result, it is possible to inhibit the function of the information processing apparatus 1 from being used by the user different from the login user. In addition, continuous use is permitted for the currently used function, whereby the login user can continue using the desired function.

In addition, for example, the auto-reset control unit 27 may restrict communication with an external apparatus via the communication interface 12. For example, when the login user selects the scan function and is performing a setting operation, it is prohibited that an external apparatus is designated as an output destination of image data. As a result, it is possible to inhibit leakage of secret information or the like due to an instruction from a user different from the login user.

In addition, for example, the auto-reset control unit 27 may restrict access to high-security information. For example, when the login user tries to acquire data to be printed from the outside via the communication interface 12, the auto-reset control unit 27 restricts access to a storage device in which high-security information is stored. Note that, not limited to an external storage device, access to the storage unit 11 may be restricted. By restricting access to high-security information in this way, it is possible to inhibit leakage of secret information or the like due to an instruction from a user different from the login user.

In addition, for example, the auto-reset control unit 27 may stop accepting voice input by the voice input unit 7 and restrict use by voice operation. In other words, the auto-reset control unit 27 prohibits use of the information processing apparatus 1 by voice operation. As a result, the information processing apparatus 1 does not need to perform the voice print authentication on the basis of a voice uttered by a user other than the login user, and can perform efficient processing. In this case, the login user can use the information processing apparatus 1 only by manual operation.

In addition, for example, in a case where a voice is inputted in the login state, when the voice print authentication unit 21 does not identify the login user, the auto-reset control unit 27 may output a warning sound via the voice output unit 8. The warning sound in this case may be, for example, a voice such as "Invalid voice input has been recognized". As a result, the login user can grasp that a voice of a user different from the login user has been recognized. A user around the information processing apparatus 1 can also grasp that the voice of the user different from the login user has been detected in the information processing apparatus 1.

In the above description, an example has been mainly described in which the auto-reset control unit 27 restricts the functions available to the login user in a case where the login user is not identified in the voice print authentication performed in the login state. However, not limited to this, even in a case where the login user is identified in the voice print authentication performed in the login state, if a content of voice operation identified by the operation reflection unit 22 is operation for a function different from a function for which voice operation is currently performed, the auto-reset control unit 27 may perform processing similar to the case where the login user is not identified. That is, after the shift to the login state, the login user performs function selection operation for selecting one of the plurality of functions, and then switching to another function is prohibited. Thus, when using another function, the login user needs to perform logout operation once, and then log in to the information processing apparatus 1 again. By imposing such a re-login operation, for example, when the login user is away from the information processing apparatus 1, it is possible to inhibit unauthorized use by another user of another function of the information processing apparatus 1.

In the above description, an example has been mainly described in which the voice print authentication unit 21 performs the voice print authentication each time a voice is inputted to the voice input unit 7. However, this is not a limitation. For example, in a case where a voice is inputted to the voice input unit 7, the voice print authentication unit 21 may determine the volume level and directivity of the input voice, and perform the voice print authentication if the voice is uttered under a predetermined condition.

For example, in a case where a voice is detected by the voice input unit 7, the voice print authentication unit 21 determines whether or not the voice is a voice uttered near the information processing apparatus 1 on the basis of the volume level of the voice. If the volume level of the voice is greater than or equal to a predetermined level, it can be determined that the voice is uttered near the information processing apparatus 1, and conversely, if the volume level of the voice is less than the predetermined level, it can be determined that the voice is uttered at a place away from the information processing apparatus 1. In a case where the voice is uttered near the information processing apparatus 1, the voice print authentication unit 21 performs the voice print authentication based on the voice. In other words, since the voice uttered at the place away from the information processing apparatus 1 is not a voice for performing voice operation on the information processing apparatus 1, the voice print authentication unit 21 omits the voice print authentication based on such a voice. As a result, there is an advantage that a processing burden can be reduced for the voice print authentication in the information processing apparatus 1.

In addition, for example, in a case where a voice is detected by the voice input unit 7, the voice print authentication unit 21 determines whether or not the voice is uttered toward the information processing apparatus 1. That is, the voice print authentication unit 21 analyzes the directivity of the voice on the basis of the volume level detected by each of the plurality of microphones 7a and 7b, and determines whether or not the voice is uttered toward the information processing apparatus 1. As a result, in a case where the voice is uttered toward the information processing apparatus 1, the voice print authentication unit 21 performs the voice print authentication based on the voice. In other words, since the voice not uttered toward the information processing apparatus 1 is not a voice for performing voice operation on the information processing apparatus 1, the voice print authentication unit 21 omits the voice print authentication based on such a voice. As a result, there is an advantage that a processing burden can be reduced for the voice print authentication in the information processing apparatus 1. Note that, the determination of the directivity of the voice may be performed together with the determination of whether or not the voice is uttered near the information processing apparatus 1 described above.

Next, specific operation will be described of the information processing apparatus 1 configured as described above. FIGS. 4 to 7 are flowcharts each illustrating an example of a processing procedure performed the information processing apparatus 1. The processing procedures illustrated in the flowcharts are processing procedures performed by the CPU of the control unit 10. When starting the processing, the information processing apparatus 1 first performs user authentication processing on the basis of login operation of a user who intends to use the information processing apparatus 1 (step S1), and determines whether or not the user authentication is successful (step S2). Here, in a case where the user can be identified in the user authentication, the user authentication is successful, and in a case where the user cannot be identified, the user authentication is unsuccessful. In a case where the user authentication is unsuccessful (NO in step S2), the processing ends.

Figure 4:
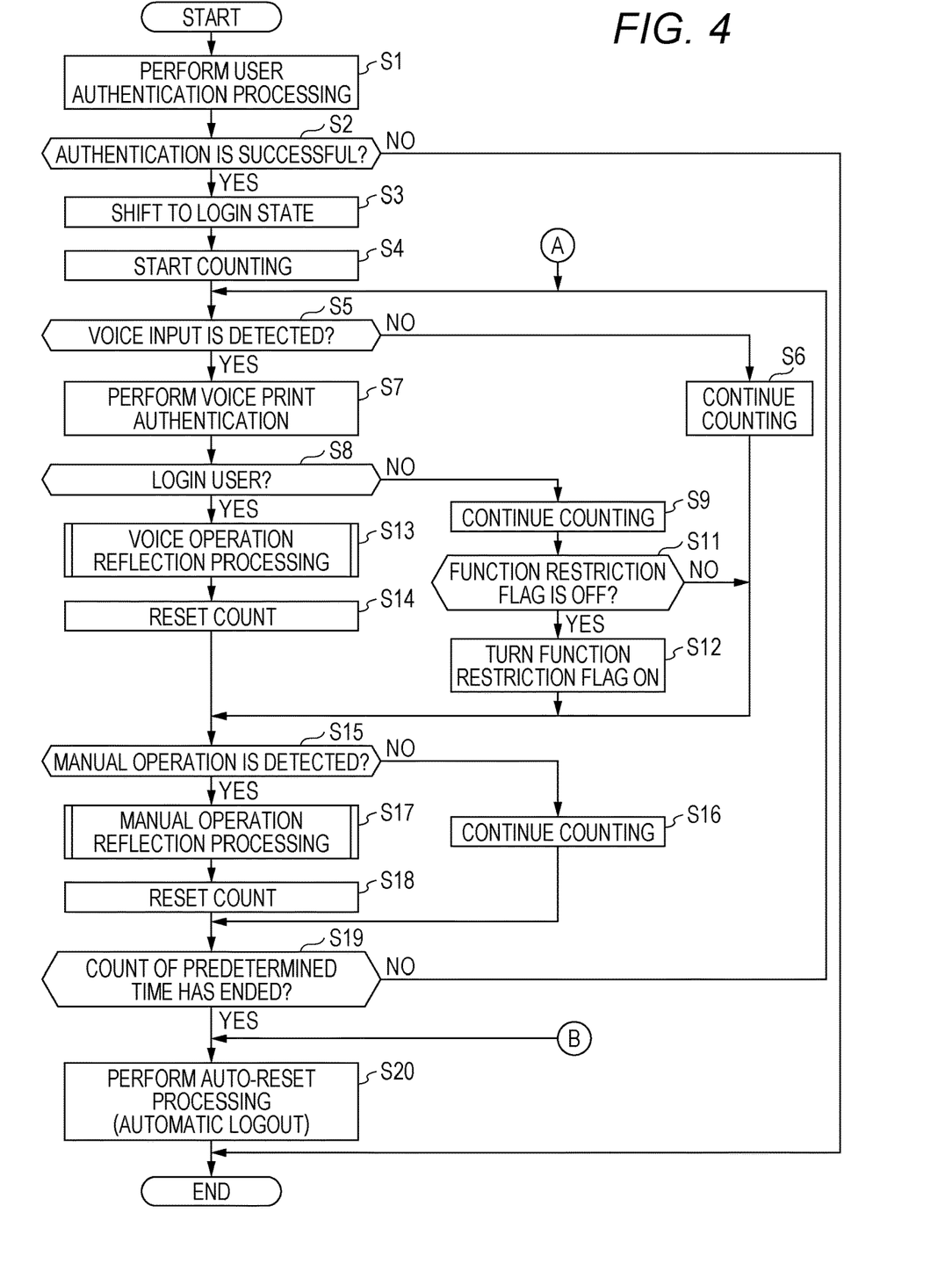
FIG. 4 is a flowchart illustrating an example of a main processing procedure performed in the information processing apparatus.

When the user authentication is successful (YES in step S2), the information processing apparatus 1 authenticates the user who has performed the login operation as a login user, and shifts the operation state to the login state (step S3). Then, the information processing apparatus 1 starts count operation for auto-reset (step S4).

Thereafter, the information processing apparatus 1 determines whether or not voice input is detected (step S5), and in a case where the voice input is not detected (NO in step S5), the count operation is continued for the auto-reset (step S6). On the other hand, in a case where the voice input is detected (YES in step S5), the information processing apparatus 1 performs the voice print authentication (step S7), and determines whether or not the user who has performed the voice input is the login user (step S8). In a case where the user who has performed the voice input is not the login user (NO in step S8), the information processing apparatus 1 continues the count operation for the auto-reset (step S9). Then, the information processing apparatus 1 determines whether or not a function restriction flag is OFF (step S11), and in a case where the function restriction flag is OFF (YES in step S11), the information processing apparatus 1 turns the function restriction flag ON (step S12). At this time, the login user may be notified of a restricted function with a warning sound. Note that, if the function restriction flag is already ON, the processing of step S12 is skipped.

In a case where it is determined that the user who has performed the voice input is the login user (YES in step S8), the information processing apparatus 1 executes voice operation reflection processing (step S13). In the voice operation reflection processing, processing is performed for reflecting voice operation by the login user in the information processing apparatus 1. Details of the voice operation reflection processing will be described later. After performing the voice operation reflection processing, the information processing apparatus 1 resets a count by the count unit 26 (step S14). As a result, a count value counted so far in the count unit 26 is initialized to 0, and a time until the auto-reset works is extended.

Subsequently, the information processing apparatus 1 determines whether or not manual input to the operation input unit 14 is detected (step S15), and in a case where the manual input is not detected (NO in step S15), the count operation is continued for the auto-reset (step S16). On the other hand, in a case where the manual input is detected (YES in step S15), the information processing apparatus 1 executes manual operation reflection processing (step S17). In the manual operation reflection processing, processing is performed for reflecting the manual operation by the login user in the information processing apparatus 1. Details of the manual operation reflection processing will be described later. After performing the manual operation reflection processing, the information processing apparatus 1 resets the count by the count unit 26 (step S18). As a result, a count value counted so far in the count unit 26 is initialized to 0, and a time until the auto-reset works is extended.

Next, the information processing apparatus 1 determines whether or not the count of a predetermined time has ended in the count unit 26 (step S19). in a case where the count of the predetermined time has not ended (NC) in step S19), it is not yet a timing to cause the auto-reset to work. For that reason, the processing by the information processing apparatus 1 returns to step S5 described above, and again accepts voice input or manual input.

On the other hand, in a case where the count of the predetermined time has ended (YES in step S19), the information processing apparatus 1 performs auto-reset processing (step S20). That is, the information processing apparatus 1 returns job setting conditions held in the setting unit 29 to initial setting conditions, and further returns a display screen of the display unit 13 to the initial screen G10. Then, the information processing apparatus 1 automatically shifts the operation state from the login state to the logout state. Thus, even if high-security information such as an image including secret information or destination information is displayed on the display unit 13 immediately before the auto-reset is performed, the auto-reset works in the information processing apparatus 1, and such information is not displayed, so that it is possible to prevent leakage of secret information.

Figure 5:
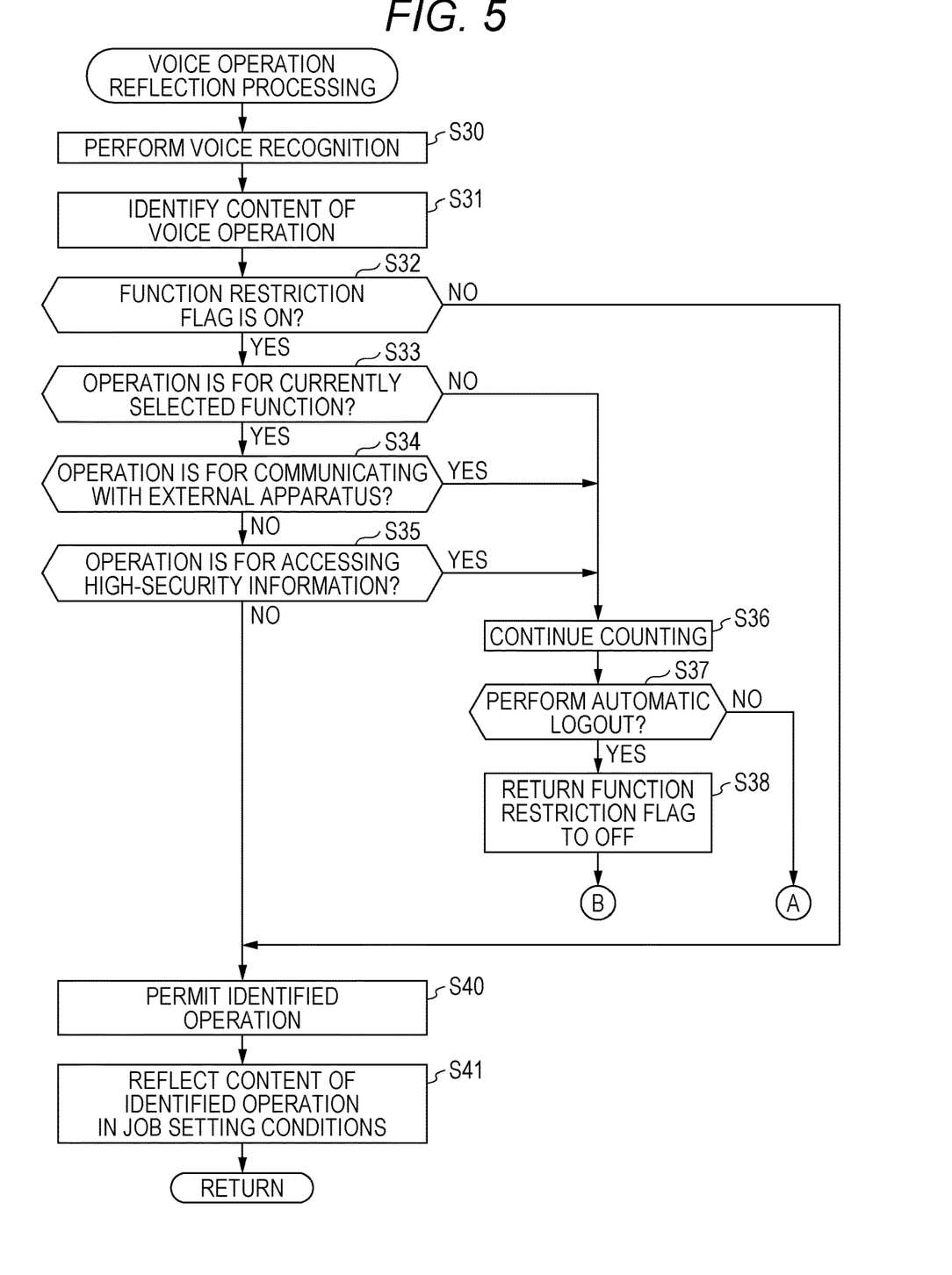
FIG. 5 is a flowchart illustrating an example of a detailed processing procedure of voice operation reflection processing.

Next, FIG. 5 is a flowchart illustrating an example of a detailed processing procedure of the voice operation reflection processing (step S13 of FIG. 4). When starting the voice operation reflection processing, the information processing apparatus 1 performs voice recognition based on the inputted voice (step S30), and performs processing for identifying a content of the voice operation (step S31). At this time, there is a case where the content of the voice operation cannot be identified. When the content of the voice operation cannot be identified, for example, the processing by the information processing apparatus 1 thereafter returns to step S5 of FIG. 4.

When the content of the voice operation can be identified, the information processing apparatus 1 determines whether or not the function restriction flag is ON (step S32). in a case where the function restriction flag is ON (YES in step S32), the information processing apparatus 1 determines whether or not the content of the voice operation identified in step S31 is operation for a currently selected function (step S33). Ina case where the content of the voice operation is the operation for the currently selected function (YES in step S33), the information processing apparatus 1 determines whether or not the content of the voice operation is operation for communicating with an external apparatus (step S34). In a case where the content of the voice operation is not the operation for communicating with the external apparatus (NO in step S34), the information processing apparatus 1 further determines whether or not the content of the voice operation is operation for accessing high-security information (step S35).

In a case where the content of the voice operation is not the operation for the currently selected function (NO in step S33), the processing by the information processing apparatus 1 proceeds to step S36. Also in a case where the content of the voice operation is the operation for communicating with the external apparatus (YES in step S34), or in a case Where the content of the voice operation is the operation for accessing high-security information (YES in step S35), the processing by the information processing apparatus 1 proceeds to step S36. Then, the information processing apparatus 1 continues the counting operation by the count unit 26 (step S36). At this time, the information processing apparatus 1 may output a warning sound to notify that operation is performed for a function restricted to be used.

Then, the information processing apparatus 1 determines whether or not to perform automatic logout (step S37). For example, the information processing apparatus 1 may store the number of times of operation performed on a function whose use is restricted, and determine to perform automatic logout in a case where the number of times of operation exceeds a predetermined number of times. In a case where it is determined that there is no need to perform automatic logout (NO in step S37), the processing by the information processing apparatus 1 returns to step S5 of FIG. 4. In a case where it is determined that automatic logout is to be performed (YES in step S37), the information processing apparatus 1 returns the function restriction flag to the initial state OFF (step S38). Thereafter, the processing by the information processing apparatus 1 proceeds to step S20 of FIG. 4, and the auto-reset processing is performed.

On the other hand, in a case where the function restriction flag is OFF (NO in step S32), the processing by the information processing apparatus 1 proceeds to step S40. Even if the function restriction flag is ON, in a case where the content of the voice operation is the operation for the currently selected function (YES in step S33), not the operation for communicating with the external apparatus (NO in step S34), and further not the operation for accessing high-security information (NO in step S35), the processing by the information processing apparatus proceeds to step S40 similarly. Then, the information processing apparatus 1 permits the voice operation identified in step S31 to be reflected in the information processing apparatus 1 (step S40), and executes processing for reflecting tire content of the voice operation performed by the login user in the job setting conditions (step S4 At this time, processing is performed for reflecting the content of the voice operation also in the display screen of the display unit 13. As a result, in the information processing apparatus 1, a setting content based on the voice operation by the login user is reflected as the job setting condition. After the above processing steps, the voice operation reflection processing ends.

Figure 6:
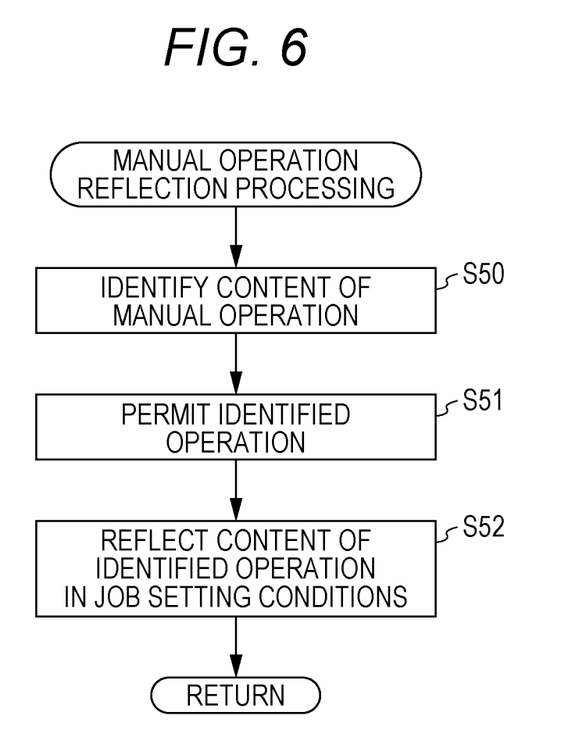
FIG. 6 is a flowchart illustrating an example of a detailed processing procedure of manual operation reflection processing.

Next, FIG. 6 is a flowchart illustrating an example of a detailed processing procedure of the manual operation reflection processing (step S17 of FIG. 4). When starting the manual operation reflection processing, the information processing apparatus 1 identifies a content of the manual operation performed on the operation input unit 14 (step S50). Unlike the case of the voice operation, in the case of the manual operation, the content of the manual operation can be reliably identified on the basis of the user's touch position on the operation input unit 14 and the like. When time content of the manual operation is identified, the information processing apparatus 1 permits the manual operation (step S51), and executes processing for reflecting the identified content of the manual operation in the job setting conditions (step S52). After the above processing steps, the manual operation reflection processing ends.

Note that, FIG. 6 illustrates an example in which the content of the manual operation is reflected in the information processing apparatus 1 even if the function restriction flag is ON in a case where the manual operation is performed. However, it is also conceivable that the login user has left the information processing apparatus 1 without performing logout operation after using the information processing apparatus 1. In such a case, if the manual operation is always permitted, there is a possibility that unauthorized use of the information processing apparatus 1 is performed by a user different from the login user. For that reason, also in a case where the manual operation is performed, similarly to the case of the voice operation, the function available to the user may be restricted if the function restriction flag is ON.

Figure 7:
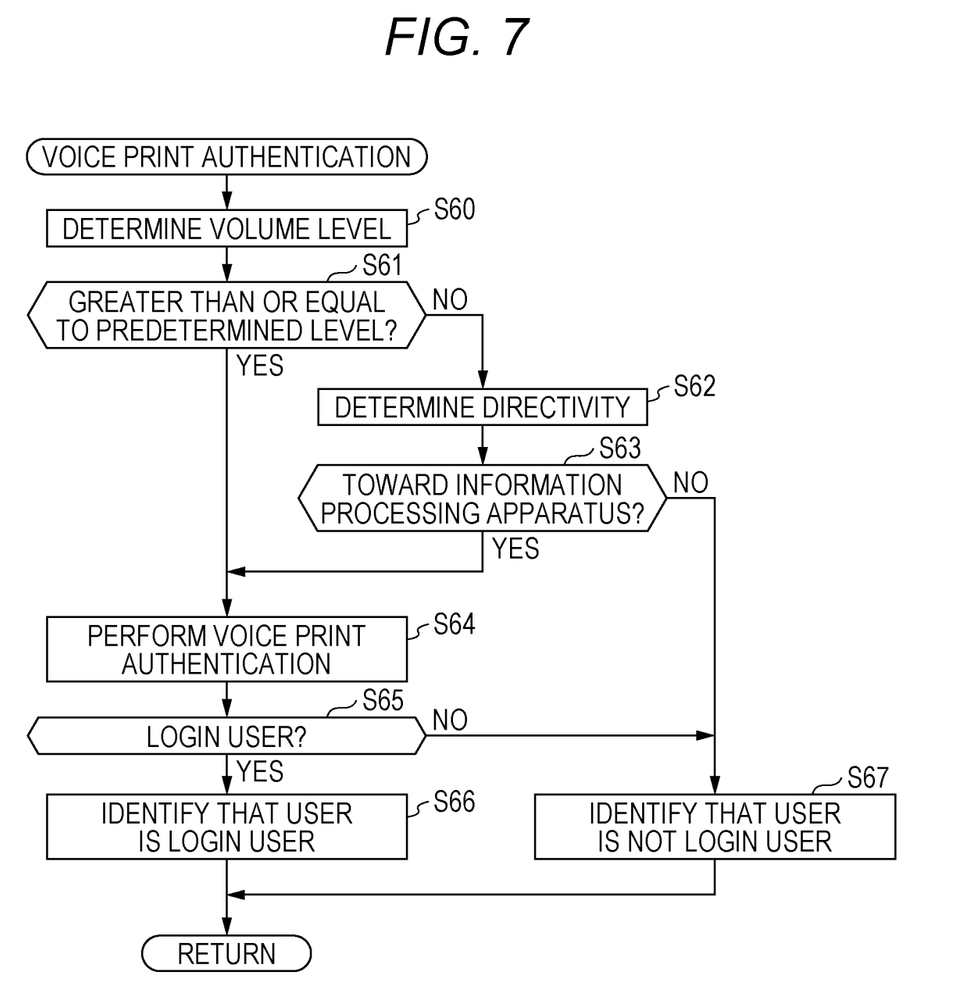
FIG. 7 is a flowchart illustrating an example of a detailed processing procedure of voice print authentication.

Next, operation will be described of a case where time volume level and directivity of the input voice are determined and the voice print authentication is performed when the information processing apparatus 1 performs the voice print authentication. FIG. 7 is a flowchart illustrating an example of a detailed processing procedure of the voice print authentication. The processing based on the flowchart of FIG. 7 can be replaced with, for example, the processing of step S7 of FIG. 4. When starting processing for the voice print authentication, the information processing apparatus 1 first determines the volume level of the inputted voice (step S60), and determines whether or not the volume level is greater than or equal to a predetermined level (step S61). In a case where the volume level of the inputted voice is less than the predetermined level (NO in step S61), the information processing apparatus 1 further determines the directivity of the voice (step S62), and determines whether or not the voice is uttered toward the information processing apparatus 1 (step S63).

In a case where the volume level of the inputted voice is greater than or equal to the predetermined level (YES in step S61), or in a case where time inputted voice is the voice uttered toward the information processing apparatus 1 (YES in step S63), the information processing apparatus 1 performs the voice print authentication based on the inputted voice (step S64). Then, the information processing apparatus 1 determines whether or not the user who has uttered the voice is the login user on the basis of the result of the voice print authentication (step S65). As a result, in a case where the user is the login user (YES in step S65), the information processing apparatus 1 identifies that the user who has performed the voice operation is the login user (step S66). In a case where the user who has uttered the voice is not the login user (NO in step S65), the information processing apparatus 1 identifies that the user who has performed the voice operation is not the login user (step S67).

In a case where the volume level of the inputted voice is less than the predetermined level (NO in step S61), and the inputted voice is not the voice uttered toward the information processing apparatus 1 (step NO in S63), the information processing apparatus 1 identifies that the user who has performed the voice operation is not the login user without performing the voice print authentication (step S67). Thus, a voice uttered at a place away from the information processing apparatus 1 or a voice not uttered toward the information processing apparatus 1 is not processed as valid voice operation on the information processing apparatus 1.

As described above, the information processing apparatus 1 of the present embodiment is configured to perform auto-reset by automatically shifting the operation state from the login state to the logout state in the case where the predetermined time has elapsed in the login state in which the login user can use the apparatus, and includes the auto-reset control unit 27 for controlling such an auto-reset function. The auto-reset control unit 27 changes the time until the auto-reset works between a case where the login user is identified by the voice print authentication based on the voice inputted to the voice input unit 7 in the login state, and a case where the login user is not identified. For that reason, even if noise emitted around the apparatus is detected, the information processing apparatus 1 can control the auto-reset function by distinguishing such noise from the voice uttered by the login user, and there is an advantage that the auto-reset function can be caused to work effectively.

In a case where the login user who is currently performing the voice operation is not identified by the voice print authentication performed in the login state, the auto-reset control unit 27 restricts the function available to the user. For that reason, it is possible to prevent unauthorized use of the information processing apparatus 1 by a user different from the login user.

The preferred embodiment related to the present invention has been described above. However, the present invention is not limited to the content described in the above embodiment, and various modifications can be applied.

For example, in the above embodiment, the case has been described where the information processing apparatus 1 is an image processing apparatus configured as an MFP, but this is not a limitation. That is, the information processing apparatus it may be an information device other than the image processing apparatus.

In the above embodiment, the case has been described where the information processing apparatus 1 includes the display unit 13 and the display screen of the display unit 13 is updated on the basis of voice operation. However, the information processing apparatus 1 does not have to include the display unit 13. That is, the auto-reset unit 25 may reset only the job setting conditions set in the setting unit 29 by causing the auto-reset to work.

In the above embodiment, the case has been described where the information processing apparatus 1 can accept both manual operation and voice operation by the user, but this is not a limitation. That is, the information processing apparatus 1 may be an apparatus that can accept only voice operation.

In the above embodiment, the case has been described where voice operation by the login user is accepted after the information processing apparatus 1 performs user authentication and shifts to the login state, when the user uses the information processing apparatus 1. However, this is not a limitation. That is, the information processing apparatus 1 may accept voice operation by the user without shifting to the login state.

In the above embodiment, the case has been described where the program 17 executed by the CPU of the control unit 10 is stored in the storage unit 11 in advance. However, the program 17 may be installed in the information processing apparatus 1 via the communication interface 12 or the like, for example. In this case, the program 17 may be provided in a form that can be downloaded via the Internet or the like, or in a form recorded on a computer readable recording medium such as a CD-ROM or a USB memory.

Although embodiments of the present invention have been described and illustrated in detail, the disclosed embodiments are made for purposes of illustration and example only and not limitation. The scope of the present invention should be interpreted by terms of the appended claims.

What is claimed is:

1. An information processing apparatus in which voice operation is enabled, the information processing apparatus comprising:
    a voice input device that accepts voice input for voice operation; and
    a hardware processor that:
        sets an inputted condition as a job;
        identifies a content of voice operation on the basis of a voice inputted to the voice input device, and reflects the content of the voice operation in setting of the job;
        returns the job set by the hardware processor to an initial setting condition in a case where a predetermined time has elapsed;
        identifies a user by performing voice print authentication each time a voice is inputted to the voice input device; and
        changes a time until a setting condition of the job is returned to the initial setting condition by the hardware processor, between a case where a user who has uttered the voice inputted to the voice input device is changed in the voice print authentication and a case where the user is not changed in the voice print authentication.

2. The information processing apparatus according to claim 1, wherein
    the hardware processor performs shifting to a login state in which voice operation by a login user is enabled,
    the hardware processor identifies the content of the voice operation on the basis of the voice inputted to the voice input device by the login user in the login state, and
    the hardware processor changes the time until the setting condition of the job is returned to the initial setting condition by the hardware processor, between a case where the user who has uttered the voice is identified as the login user by the voice print authentication based on the voice inputted to the voice input device in the login state and a case where the user who has uttered the voice is not identified as the login user.

3. The information processing apparatus according to claim 2, wherein the hardware processor performs shifting from the login state to a logout state in a case where the predetermined time has elapsed in the login state.

4. The information processing apparatus according to claim 1, further comprising
    a display that displays the setting condition of the job set by the hardware processor, wherein
    the hardware processor returns the setting condition of the job displayed on the display to the initial setting condition in a case where the predetermined time has elapsed.

5. The information processing apparatus according to claim 1, wherein the hardware processor includes a counter that counts an elapsed time, and determines whether or not the predetermined time has elapsed on the basis of the elapsed time counted by the counter.

6. The information processing apparatus according to claim 5, wherein the hardware processor resets a count by the counter in a case where the user who has uttered the voice is identified as a user currently performing voice operation, by the voice print authentication, and continues counting by the counter in a case where the user who has uttered the voice is not identified as the user currently performing voice operation.

7. The information processing apparatus according to claim 5, wherein the hardware processor continues counting the elapsed time regardless of voice input in a case where it is determined that the user who has uttered the voice inputted to the voice input device has been changed, by the voice print authentication, and resets a count of the elapsed time in response to voice input in a case where it is determined that the user who has uttered the voice has not been changed.

8. The information processing apparatus according to claim 7, wherein the hardware processor determines whether or not the user who has uttered the voice inputted to the voice input device has been changed from a login user.

9. The information processing apparatus according to claim 5, wherein the hardware processor continues counting by the counter when a voice is not inputted to the voice input device.

10. The information processing apparatus according to claim 5, further comprising
an operation input device that accepts input by manual operation by a user, wherein
the hardware processor reflects a content of manual operation in the setting condition of the job in a case where the manual operation is performed on the operation input device, and
the hardware processor continues counting by the counter when input by manual operation is not performed on the operation input device and a voice is not inputted to the voice input device.

11. The information processing apparatus according to claim 1, wherein the hardware processor shortens the predetermined time in a case where the user who has uttered the voice is not identified as a user currently performing voice operation, by the voice print authentication.

12. The information processing apparatus according to claim 1, wherein the hardware processor restricts a function available to a user in a case where the user who has uttered the voice is not identified as a user currently performing voice operation, by the voice print authentication.

13. The information processing apparatus according to claim 12, wherein the hardware processor restricts switching to a function different from a function for which a user is currently performing operation in a case where the user who has uttered the voice is not identified as a user currently performing voice operation, by the voice print authentication.

14. The information processing apparatus according to claim 12, further comprising
a communication device that communicates with an external apparatus, wherein
the hardware processor restricts communication with the external apparatus via the communication device in a case where the user who has uttered the voice is not identified as a user currently performing voice operation, by the voice print authentication.

15. The information processing apparatus according to claim 12, wherein the hardware processor restricts access to high-security information in a case where the user who has uttered the voice is not identified as a user currently performing voice operation, by the voice print authentication.

16. The information processing apparatus according to claim 12, wherein the hardware processor stops accepting voice input by the voice input device in a case where the user who has uttered the voice is not identified as a user currently performing voice operation, by the voice print authentication.

17. The information processing apparatus according to claim 1, further comprising
a voice output device that outputs voice, wherein
the hardware processor outputs a warning sound via the voice output device in a case where the user who has uttered the voice is not identified as a user currently performing voice operation, by the voice print authentication.

18. The information processing apparatus according to claim 1, wherein the hardware processor performs the voice print authentication in a case where a volume level of the voice inputted to the voice input device is greater than or equal to a predetermined level.

19. The information processing apparatus according to claim 1, wherein the hardware processor performs the voice print authentication in a case where the voice inputted to the voice input device is a voice uttered toward the information processing apparatus.

20. The information processing apparatus according to claim 1, wherein in a case where the user who has uttered the voice is identified as a user currently performing voice operation, by the voice print authentication, when the content of the voice operation identified by the hardware processor is operation for a function different from a function for which voice operation is currently performed, the hardware processor performs processing identical to processing of a case where the user who has uttered the voice is not identified as a user currently performing voice operation, by the voice print authentication.

21. The information processing apparatus according to claim 1, wherein the information processing apparatus is an image processing apparatus that executes a job corresponding to a function selected by a user.

22. A non-transitory recording medium storing a computer readable program executed in an information processing apparatus including a voice input device that accepts voice input for voice operation,
the program causing the information processing apparatus to execute:
setting an inputted condition as a job;
identifying a content of voice operation on the basis of a voice inputted to the voice input device, and reflecting the content of the voice operation in setting of the job;
returning the job set by the setting to an initial setting condition in a case where a predetermined time has elapsed;
identifying a user by performing voice print authentication each time a voice is inputted to the voice input device; and
changing a time until a setting condition of the job is returned to the initial setting condition by the returning, between a case where a user who has uttered the voice inputted to the voice input device is changed in the voice print authentication and a case where the user is not changed in the voice print authentication.

* * * * *